May 24, 1966 R. LINDSTROM 3,252,211
FRAME HORN REPLACEMENT METHOD AND APPARATUS
Filed Jan. 31, 1964 2 Sheets-Sheet 1
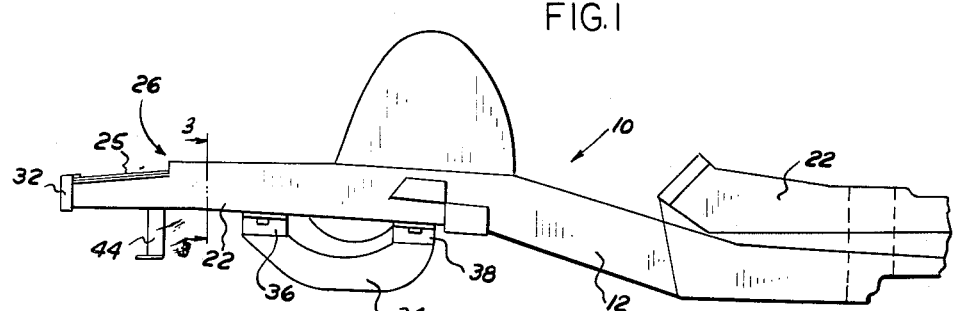
FIG.1
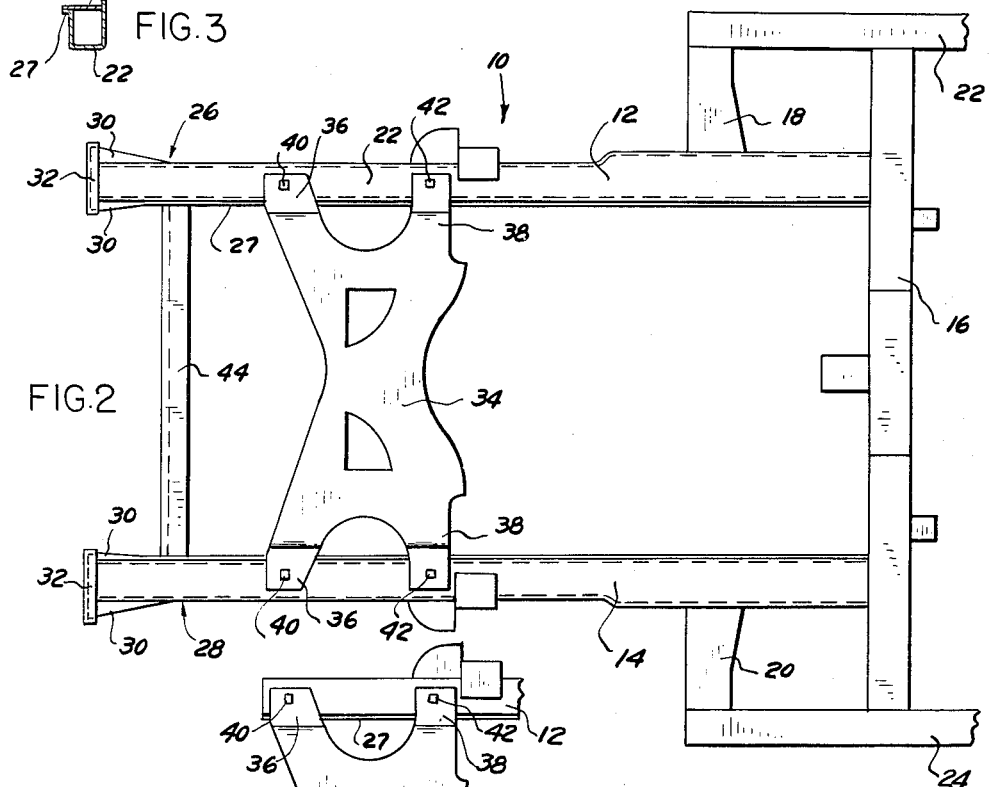
FIG.3
FIG.2
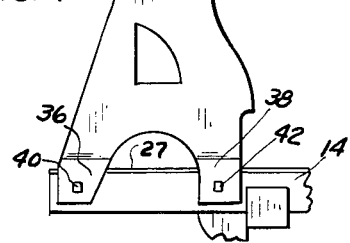
FIG.4
INVENTOR.
RODNEY LINDSTROM
BY
ATTORNEY May 24, 1966 R. LINDSTROM 3,252,211
FRAME HORN REPLACEMENT METHOD AND APPARATUS
Filed Jan. 31, 1964 2 Sheets-Sheet 2
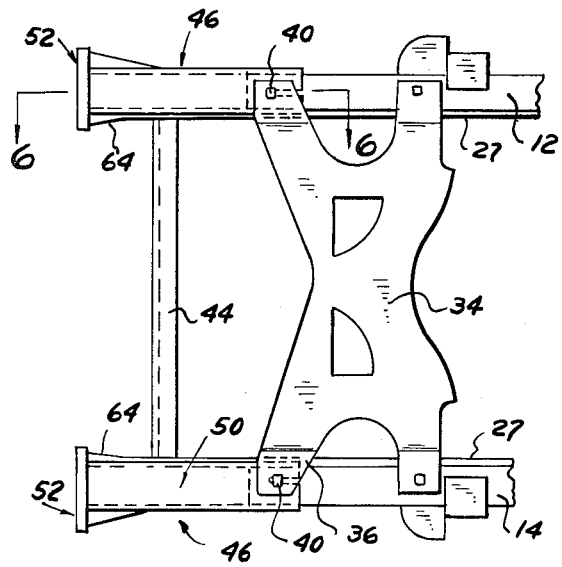
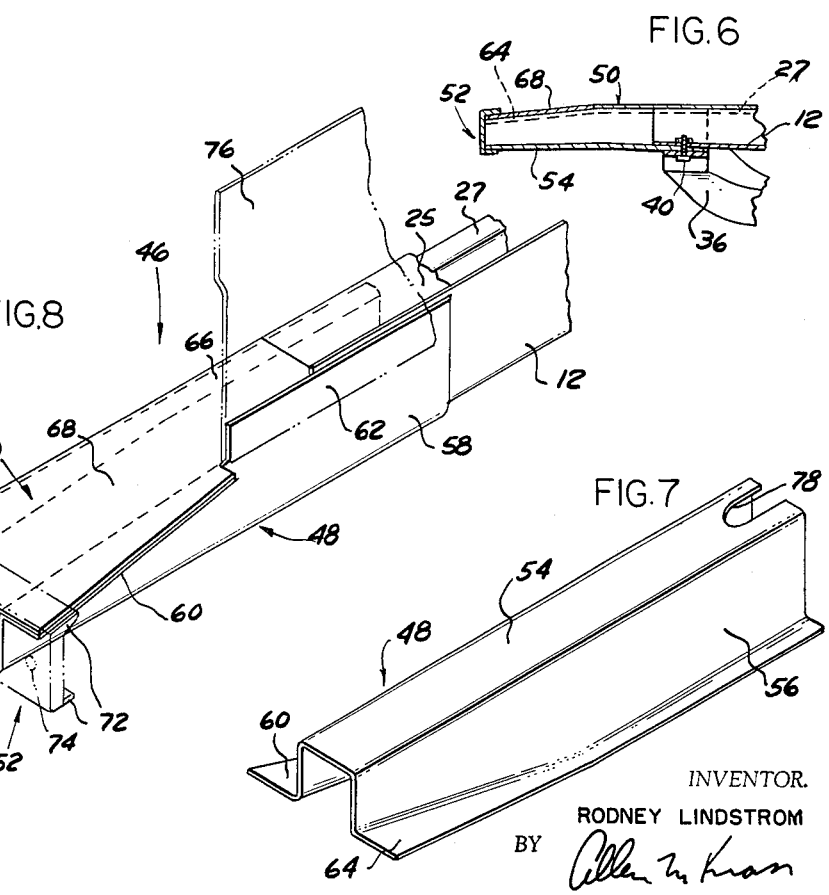
INVENTOR.
RODNEY LINDSTROM
BY
ATTORNEY United States Patent Office
3,252,211
Patented May 24, 1966

3,252,211
FRAME HORN REPLACEMENT METHOD AND
APPARATUS
Rodney Lindstrom, 36116 Parkdale, Livonia, Mich.
Filed Jan. 31, 1964, Ser. No. 341,539
1 Claim. (Cl. 29—401)

This invention relates to the repair of automobile chassis and more particularly has reference to a method and apparatus for replacement of the frame horn on the underbody of a unitized automotive frame structure.

In a unitized or integrally constructed automotive vehicle, the side frame rails of the underbody structure are welded to the fender skirts which in turn are fixed to the front fenders. The front bumper is bolted on the forward faces of the frame horns which are an integral part of the side frame rails.

When an automobile is involved in a front-end collision, the grille and bumper are ordinarily damaged. In addition, the frame horns will usually be distorted and damaged along their unsupported length between the bumper and the supporting crossmember.

When the frame horns are damaged in a unitized frame of this kind, their repair may require considerable expense. Since the entire front frame section, including the fender skirts, are welded to form a single structure, neither the skirts, the frame horns, nor any other part of the front frame section may be separately removed and replaced with a new unit. Damage to these members, therefore, always requires that a choice be made between replacing the entire front frame section of the vehicle, and bumping out the damaged parts.

The cost of replacing the front frame section is so considerable that, with the exception of major collision damage, it is more economical to bump out the damaged parts. However, the damage to the frame horn is usually quite substantial, and bumping them into their original shape is consequently a very time-consuming, and hence expensive, operation.

It is the principal object of the present invention to provide a method and apparatus for replacing either or both frame horns on a unitized vehicle body without replacing the rest of the front frame section.

As will be described subsequently in greater detail, the method of the present invention comprises cutting off the damaged frame horn just forward of the crossmember and replacing this section with a pre-formed frame horn having dimensions and a configuration substantially the same as the original frame horn. The replacement frame horn is slightly longer and wider than the section removed so that its rearward end fits along and around the remaining side rail adjacent the crossmember attaching bolt. The replacement frame horn includes a slot along the rear of its lower face which fits about the crossmember bolt. The rearward end of the frame horn fits about the skirt or side shield which has been welded to the outer vertical face of the side rail. The new frame horn is then welded to the existing adjacent side rail structure.

The replacement frame horn is extremely simple and inexpensive to fabricate. The entire operation, described above, of removing the damaged horn and mounting the replacement can be completed very quickly at a fraction of the cost of bumping the damaged horn into shape.

In addition, the resulting front frame structure is as strong as the original undamaged structure.

Other objects and advantages of the present invention will be more readily apparent from the following detailed description of a preferred embodiment thereof. The description makes reference to the drawings in which:

FIGURE 1 is a side view of the front frame section on the underbody of a unitized automobile frame;

FIGURE 2 is a bottom view of the front frame section of FIGURE 1;

FIGURE 3 is a cross-sectional view taken along the lines 3—3 in FIGURE 1;

FIGURE 4 is a bottom view of a portion of the front frame section with the frame horns severed and removed;

FIGURE 5 is a view similar to that of FIGURE 4 showing the replacement frame horns mounted in place;

FIGURE 6 is a detail cross-sectional view taken along the lines 6—6 in FIGURE 5;

FIGURE 7 is a bottom prespective view of the channel portion of the replacement frame horn; and FIGURE 8 is a perspective view of the present replacement frame horn mounted in place on a left side rail, the forward face of the frame horn and a section of the adjacent shield being shown in phantom lines for purposes of clarity.

Referring to the drawings in detail, FIGURES 1–3 show the front frame section 10 on the underbody of a unitized automobile frame. A pair of spaced-apart parallel side rails 12 and 14 are welded at their rearward ends to a transverse underbody member 16 and to short frame members 18 and 20. The transverse member 16 and frame members 18 and 20 are bolted to the forward ends of longitudinal central rails 22 and 24. The side rails 12 and 14 and the members 16, 18, and 20, thus comprise the front frame section 10.

As illustrated in FIGURE 3, the side rails 12 and 14 are hollow and rectangular in cross-section. These side rails are each constructed of an elongated channel member 22 having an elongated rectangular plate 25 welded to the outer edges of a first upwardly extending arm and a horizontal flange 27 on a second vertical arm.

The forward end of each side rail 12 and 14 comprises a frame horn 26 and 28. The frame horn is similar in cross-section to the remainder of the side rail but reduced in size, the upper plate 25 sloping downwardly, toward its forward end as shown in FIGURE 1. A pair of small tapering fins 30 project horizontally outward from the sides of the forward end of the frame horn 26 and 28. A rectangular cap 32 is fixed transversely across the front end of each frame horn.

A crossmember 34 is mounted between the side rails 12 and 14. The crossmember 34 includes a pair of forward arms 36 and a pair of rearward arms 38. Bolts 40 and 42 respectively fix the arms 36 and 38 to the lower faces of the side rails 12 and 14.

A radiator yoke mounting member 44 extends between the frame horns 26 and 28 adjacent the rearward ends of the fins 30.

In most front-end collisions the frame horns 26 and 28 are damaged since they are unsupported forward of the crossmember 34 (the radiator yoke mounting does not provide any structural support). Usually the damage is confined to the portions of the side rails 12 and 14 forward of the crossmember.

FIGURES 4 and 5 show both frame horns replaced by new horn structures. This is accomplished by first cutting off the frame horns just forward of the forward arms 36 of the crossmember as shown in FIGURE 4. A replacement frame horn 46 is then mounted at each severed end of the side rails as shown in FIGURE 5, and a new radiator yoke mounting fixed between the horns.

FIGURES 6–8 show the construction of the replacement frame horn 46. This frame horn includes a channel member 48, a plate 50, and a front cap 52. The channel member 48 has a horizontal base 54 and upwardly extending walls 56 and 58. The wall 58 includes a horizontal lip 60 along its forward end. This lip tapers and is inclined between its forward end at the front of the frame horn and its rearward end. The wall 58 includes an upper face 62 which projects vertically above the plane of the lip 60 immediately behind the rear of the lip.

The wall 56 of the frame horn 46 includes a horizontal lip 64 which projects outwardly from the wall and is tapered and inclined at its forward end in a manner somewhat similar to lip 60.

The plate 50 is adapted to be mounted on the upper edges of the lips 60 and 64. The plate includes a rear rectangular portion 66 normally disposed between the lip 64 and the wall 58 adjacent the upper face 62. The forward end 68 of the plate is tapered and inclined so that it corresponds in size and shape to the area between the outer edges of the opposing lips 60 and 64.

The front cap 52 comprises a vertical face 70 and rearwardly projecting horizontal flanges 72. The face 70 is adapted to fit against the forward edges of the channel member 48 and the plate 50. The flanges 72 fit over the forward portion of the plate 50 and under the base 54 of the channel member 48. Holes 74 extend through the face 70.

The channel member 48, plate 50, and front cap 52 thus form substantially the same structure as the original frame horn 26 and 28. However, the base 54 of the channel member 48 is slightly wider than the base of the original frame horn, thus permitting the rearward end of the replacement horn 46 to surround the original side rail 12 and 14 at the point where the damaged horn was removed as shown in FIGURE 8. In addition, the outer wall 58 fits along the outside of the front fender skirt 76 which is normally welded to the outer surface of the channel member 22. The base 54 of the replacement channel member 48 includes an elongated slot 78 at its rearward end.

The method of replacing a damaged frame horn 26 or 28 contemplated by the present invention comprises, first, cutting off the damaged horn just forward of the arm 36 on the crossmember 34. The yoke mounting 44 is detached for this purpose. The replacement horn 46 is then fitted over the remaining severed end of the side rail 10 or 12 with the existing skirt 76 between the side rail and the wall 58 of the new horn. The slot 78 in the base 54 fits about the bolt 40 which attaches the crossmember 34 to the side rail.

The entire replacement frame horn 46 is then welded together and to the existing side rail. If desirable, the channel member 48, plate 50, and cap 52 may be prewelded and provided as a single unit.

The yoke mounting 44 is then mounted into its normal position. The front bumper may then be mounted in place, engaging the holes 74 in the face of the cap 52.

If necessary, both frame horns 26 and 28 may be replaced as was done in FIGURES 4 and 5. Any damaged part of the remaining side rails or skirts may be bumped out in the usual manner.

The replacement horn may be constructed of any suitable structural material. The connections between the various parts of the horn and the existing side rail may be by welding or any other desirable technique.

Having thus described my invention, I claim:

A method of replacing the frame horn on the underbody of a unitized automobile frame having a crossmember bolted to side rails, comprising:
severing the existing frame horn from the side rail at a point slightly forward of the crossmember mounting;
positioning a replacement frame having larger width and height dimensions and substantially the same configuration as the original horn over the remaining severed side rail past said crossmember mounting, said new horn having a slot adapted to accommodate the bolt fixing said crossmember to said side rail;
and permanently affixing said replacement horn to the existing adjacent automobile frame structure.

References Cited by the Examiner
UNITED STATES PATENTS

| | | | |
|---|---|---|---|
| 1,263,739 | 4/1918 | Brown | 29—401 |
| 2,072,044 | 2/1937 | Widman | 280—106 |
| 2,901,266 | 8/1959 | Lindsay | 280—106 |

BENJAMIN HERSH, *Primary Examiner.*

A. HARRY LEVY, *Examiner.*

P. GOODMAN, *Assistant Examiner.*